April 14, 1953      F. T. ASTRELLA      2,634,467
FLEXIBLE MOLDING STRIP
Filed April 4, 1951
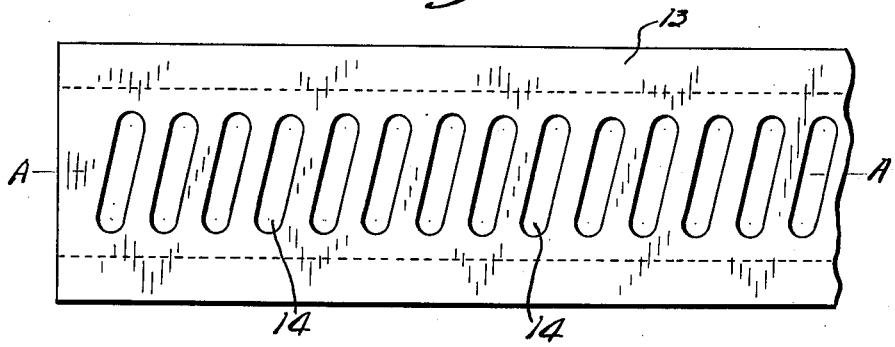
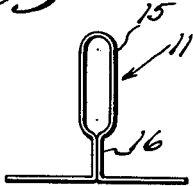 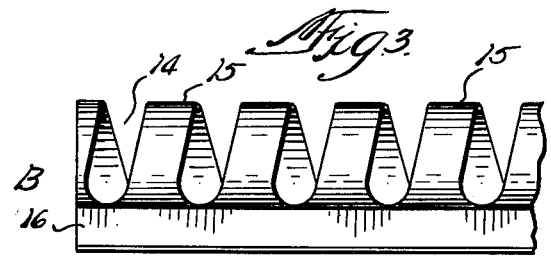
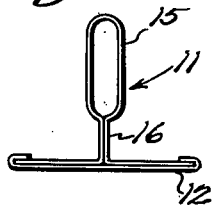 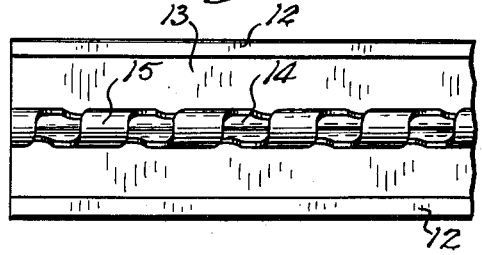
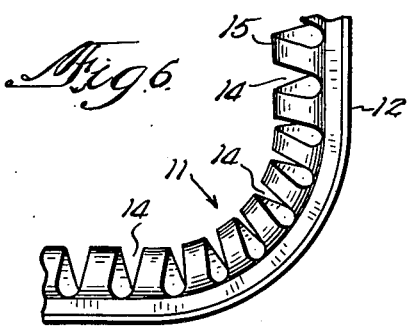
INVENTOR.
Frank T. Astrella Patented Apr. 14, 1953

2,634,467

UNITED STATES PATENT OFFICE 2,634,467

FLEXIBLE MOLDING STRIP

Frank T. Astrella, Elmwood Park, Ill., assignor to Pyramid Mouldings, Inc., Chicago, Ill., a corporation of Illinois Application April 4, 1951, Serial No. 219,157

7 Claims. (Cl. 20—74)

This invention relates to a flexible molding strip and a method of producing the same. It is an object of the invention to provide an improved flexible molding strip and an improved method of producing such a strip.

Molding strips are commonly provided for sealing joints between various elements of a construction, for example, between a kitchen sink and an adjoining drainboard, or may serve merely to decorate a construction, as by securing the molding strip to the edges of a table. Such molding strips are most commonly made of aluminum, stainless steel or plastics. One of the most common types of molding strip employed for such purposes is a T-shaped strip which comprises a decorative face member which may span a joint, and a leg member protruding perpendicularly from the rearward surface of the face member. The leg member is arranged to extend into a slot provided for that purpose or into the joint between the adjoining elements of a construction, and serves to secure the molding strip to the construction.

Frequently it is necessary to bend such a molding strip to follow the contour of a curved surface, in which case the perpendicularly extending leg member tends to buckle, especially where the curve is one of small radius. In such cases, it is desirable that the leg member be slotted or otherwise interrupted at closely spaced points to prevent buckling. However, in certain applications of molding strip, such as that in which a molding strip is secured to the edge surface of a table top with the leg member extending into a slot in the edge of the table provided for that purpose, it is desired that screws, nails or other fasteners be driven through the bottom of the table top and into or through the leg member of the molding strip to hold the strip firmly to the table. In such an application if the leg member of the molding strip is slotted, the nail or other fastener may pass through a slot in the leg member and thereby fail to engage this member. It is another object of the invention to provide an improved molding strip having a slotted leg member to provide flexibility of the molding strip while at the same time providing a substantially continuous surface to be engaged by such fasteners. It is another object of the invention to provide an improved method of producing such a molding strip.

According to one embodiment of the invention the leg portion comprises a double layer of sheet material formed from a single strip which is folded upon itself along a line parallel to the longitudinal edges of the strip. The strip is slotted before folding, with the slots extending to both sides of the line of the fold and lying at a substantial angle both to the edges of the sheet and to the perpendicular thereto. When the strip is folded the portions of the leg member between adjacent slots assume the form of a plurality of tongues joined together at their bases, the tongue portion of one layer of the folded strip overlying a substantial portion of one of the slots in the opposed layer of the strip. The base of the leg member, which is formed by the uninterrupted edge portions of the sheet is then secured to the face member of the molding strip and a flexible molding strip is thereby obtained which presents a substantially continuous leg member to be engaged by fasteners to hold the molding strip in place.

Accordingly, it is another object of the invention to provide an improved leg member for a molding strip, said leg member being flexible and thereby readily bent edgewise while still presenting a substantially continuous surface. It is another object of the invention to provide an improved method for producing such a leg member of a molding strip.

It is another object of the invention to provide an improved molding strip having the advantages indicated above while being simple, reliable and inexpensive to manufacture. It is another object of the invention to provide an improved method for producing a molding strip having the advantages indicated above while being simple and reliable.

This invention, together with further objects and advantages thereof, will best be understood by reference to the following description taken in connection with the accompanying drawing, and its scope will be pointed out in the appended claims.

In the drawing in which like parts are designated by like reference numerals,

Fig. 1 is a plan view of a strip of sheet material upon which one operation has been performed in preparation for making said strip into the leg member of a T-shaped molding strip;

Fig. 2 is an end view of the same sheet of material after it has been formed into a leg member for a T-shaped molding strip;

Fig. 3 is a side elevational view of the leg member disclosed in Fig. 2;

Fig. 4 is a view similar to Fig. 2 but showing a facing member secured to the leg member;

Fig. 5 is a plan view of the molding strip shown in Fig. 4;

Fig. 6 is an elevational view of the completed molding strip showing the molding strip bent in a curve of short radius; and, Fig. 7 is a cross-sectional view of a table top and the molding strip shown in Figs. 4, 5 and 6, illustrating one application of the molding strip.

The molding strip illustrated in the drawing is of a form known in the trade as a T-shaped molding strip by virtue of the fact that it has a leg member 11 extending essentially perpendicularly from the center of the rearward surface of a face member 12. According to the embodiment of the invention illustrated, the leg member 11 is formed from a strip of sheet material 13 which may, for example, be of galvanized steel. Elongated slots 14 are formed therein having their major axes lying at an oblique angle with respect to the parallel longitudinal edges of the strip 13, that is the major axes of the slots lie along lines angularly displaced to a substantial degree from perpendicularity to the strip edges and from parallelism with the strip edges. The edges of the strip 13 may, of course, be saw-toothed or otherwise undulating for any reason whatever but it is the general or overall borders of the strip to which reference is made immediately above.

After the slots 14 have been formed the strip 13 is bent along its longitudinal center line designated AA in Fig. 1. The strip 13 is thereby doubled upon itself to form a double thickness leg member 11, the edge portions of the strip 13 being brought together to form the base of the leg member.

In the interest of simplifying the securing of the leg member 11 to the facing member 12, the base of the leg member may be folded open to form a T as may readily be seen in Figs. 2 and 4. The face member 12 may then be secured to the leg member 11 by doubling its edges over the outwardly extending longitudinal edges of the base of the leg member 11.

It will be readily apparent in Fig. 3 that the orientation of the slots 14 in the oblique manner specified above results in each slot 14 in one layer of the leg member 11 being partially overlaid by the remaining material in the other layer of this member. The slots 14 define a plurality of tongues 15 consisting of two layers of material, the tongue portions of one layer being disposed at a substantial angle, in the general plane of the leg member, to the tongue portions of the other layer. Each tongue portion of one layer thereby partially overlies one of the slots 14 defining the edges of the other portion of the same tongue. Further in reference to Fig. 3 it will be noted that the resultant opening which extends entirely through the leg member 11 is a V-shaped opening having less than half of the area of the slot 14 appearing in either layer of the leg member.

The provision of the slots 14 provides flexibility of the leg member 11 such that the molding strip may be bent around a curve of small radius as shown in Fig. 6 without buckling of the leg member. This becomes possible by virtue of the fact that a substantial amount of material is removed from the free edge of the leg member, at closely spaced intervals and to a substantial depth, whereby the free edge of the leg member may shorten in conformity with the bending of the molding strip without buckling.

At the same time the resultant opening extending entirely through the leg member becomes the relative narrow V-shaped opening seen in Fig. 3, which does not extend to the same depth as the slots 14. This latter feature is desirable in an application such as that illustrated in Fig. 7 wherein it is intended that a fastening device such as a nail 18 is to pierce the leg member of the molding strip to anchor the strip to some structure such as a table top 19. In Fig. 7, it will be noted that a groove 20 is provided in the edge of the table top 19 for the purpose of receiving the leg member 11 of the molding strip. The nail 18 may be driven through the bottom of the table top and through the leg member 11 as shown to anchor the molding strip securely.

If slots of substantial width, such as the slots 14, are formed straight through the leg portion of a molding strip in order to provide flexibility thereof, fasteners such as the nails 18 may frequently pass through one of these openings with the obvious result that the fastener fails to engage the leg portion of the molding strip. In the embodiment of the invention shown in the drawing and described above, slots of substantial width are provided in the interest of flexibility while the resultant openings extending entirely through the leg member are of relatively small area. The nails 18 thereby are much more likely to engage the leg member of the molding strip and if located below the line BB of Fig. 3 will always engage solid material.

One disadvantage arising from any buckling of the leg member 11 is that it would prevent insertion of the leg member into the slot 20. As is noted above, a molding strip constructed in accordance with the invention circumvents this difficulty.

It will be seen in Figs. 2 and 4, that the portion of the leg member adjacent the free edge thereof is arranged in an expanded or bulblike form. The opposed layers of material forming the leg member may thereby better grip the sides of the slot 20. The material of which the leg member 11 is constructed is preferably somewhat resilient in order to enhance the gripping action between the expanded portion thereof and the sides of the slot 20. Such an arrangement is intended, of course, to come within the definition of the invention expressed above wherein it is stated that the sheet 13 is doubled upon itself by folding along the line designated AA. The fold, in other words, need not be a sharp one, nor is it essential to the invention that the edge portions of the strip 13 be brought into contact or even into close proximity to form the leg base 16.

The slots 14 may, of course, be of various shapes and the leg member 11 may be of various formations while still coming within the scope of the invention. What is perhaps the principal feature of the invention is that the leg member is formed of two layers of material, each having open ended slots therein, with at least the closed ends of the slots in the respective layers being displaced from each other whereby the resultant opening which passes entirely through the leg member assembly is substantially smaller than the individual slots.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A flexible molding strip comprising an elongated sheetlike face member and an elongated leg member, said leg member having a base edge secured to said face member and a free edge spaced from and extending parallel to said face member, said leg member comprising two layers of sheet material secured to each other along said free edge, each of said layers having slots therein extending to the free edge thereof and toward the base edge thereof, the corresponding ends of said slots in said two layers adjacent said base edge of said leg member being spaced apart longitudinally of said leg member, the ends of the corresponding slots at said free edge opening into each other to form a continuous slot.

2. A flexible T-shaped molding strip comprising a facing member, and a leg member having a base portion secured to said facing member and a free edge spaced from and extending parallel to said facing member, said leg portion comprising two layers of sheet material secured to each other along said free edge, each of said layers including a plurality of outwardly extending longitudinally spaced tongues joined at said base portion, said tongues of one of said two layers being longitudinally displaced from the tongues of the other of said layers adjacent said facing member, corresponding ones of said tongues of opposed layers being joined at said free edge.

3. A flexible T-shaped molding strip including a facing member and a leg member having a base portion secured to said facing member and a free edge spaced from and extending parallel to said facing member, said leg portion comprising two layers of sheet material secured to each other along said free edge, each of said layers including a plurality of outwardly extending longitudinally spaced tongues joined at said base portion and defined by slots of substantial width, said tongues of one of said two layers overlying the slots defining the tongues of the other of said two layers adjacent said facing member, corresponding ones of said tongues of opposed layers being joined at said free edge.

4. A flexible T-shaped molding strip including a facing member and a leg member having a base portion secured to said facing member and a free edge spaced from and extending parallel to said facing member, said leg portion comprising two layers of sheet material secured to each other along said free edge, each of said layers including a plurality of outwardly extending longitudinally spaced tongues joined at said base portion and defined by slots of substantial width, the free end of each tongue being coextensive longitudinally of said leg member with the free end of a tongue in the opposed layer of said leg member and being joined thereto, said tongues of one of said two layers extending at a substantial angle relative to the tongues of the other of said layers whereby each of said tongues overlies at least a portion of a slot between tongues of the opposed layer.

5. A flexible T-shaped molding strip including a facing member and a leg member having a base portion secured to said facing member and a free edge spaced from and extending parallel to said facing member, said leg portion comprising two layers of sheet material secured to each other along said free edge, each of said layers including a plurality of outwardly extending longitudinally spaced tongues joined at said base portion and defined by slots of substantial width, the free end of each tongue being coextensive longitudinally of said leg member with the free end of a tongue in the opposed layer of said leg member and being joined thereto, the longitudinal axis of at least the portions of said tongues adjacent the free edge of one of said layers extending at a substantial angle to at least the portions of said tongues adjacent the free edge of the other of said layers whereby each of said tongues overlies at least a portion of a slot between tongues of the opposed layer.

6. A flexible T-shaped molding strip including a facing member and a leg member having a base portion secured to said facing member and a free edge spaced from and extending parallel to said facing member, said leg portion comprising a sheet of material having a substantially 180° bend along said free edge forming two layers of sheet material, each of said layers including a plurality of outwardly extending longitudinally spaced tongues joined at said base portion and defined by slots of substantial width, the free end of each tongue being coextensive longitudinally of said leg member with the free end of a tongue in the opposed layer of said leg member and being joined thereto, the longitudinal axis of at least the portions of said tongues adjacent the free edge of one of said layers extending at a substantial angle to at least the portions of said tongues adjacent the free edge of the other of said layers whereby each of said tongues overlies at least a portion of a slot between tongues of the opposed layer.

7. A flexible T-shaped molding strip including a facing member and a leg member having a base portion secured to said facing member and a free edge spaced from and extending parallel to said facing member, said leg portion comprising a sheet of material having a substantially 180° bend along said free edge forming two layers of sheet material, each of said layers including a plurality of outwardly extending longitudinally spaced tongues joined at said base portion and defined by slots of substantial width, the free end of each tongue being coextensive longitudinally of said leg member with the free end of a tongue in the opposed layer of said leg member and being joined thereto, the portion of each tongue of one of said layers adjacent to said facing member being longitudinally disposed from the portion of the corresponding tongue of the other of said layers adjacent to said facing member.

FRANK T. ASTRELLA.

References Cited in the file of this patent

UNITED STATES PATENTS

| Number | Name | Date |
| --- | --- | --- |
| 1,837,775 | Howard | Dec. 22, 1931 |
| 1,907,044 | Crowe | May 2, 1933 |
| 2,080,166 | Crowe | May 11, 1937 |
| 2,169,503 | Schlegel | Aug. 15, 1939 |
| 2,231,316 | Bailey | Feb. 11, 1941 |

OTHER REFERENCES

Herron-Zimmers Catalogue, Oct. 7, 1942, page 8, No. 4335.